US008068823B2

(12) United States Patent
Razdan

(10) Patent No.: US 8,068,823 B2
(45) Date of Patent: Nov. 29, 2011

(54) OPTIMIZING CALL SETUP LATENCY FOR GEOGRAPHICALLY DENSE GROUPS

(75) Inventor: Ashu Razdan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1115 days.

(21) Appl. No.: 11/609,971

(22) Filed: Dec. 13, 2006

(65) Prior Publication Data

US 2008/0146207 A1    Jun. 19, 2008

(51) Int. Cl.
*H04M 3/42*    (2006.01)
(52) U.S. Cl. ........ 455/416; 370/260; 370/261; 370/266; 370/270; 370/271; 455/417
(58) Field of Classification Search .................. None
See application file for complete search history.

(56) References Cited

U.S. PATENT DOCUMENTS

| | | | |
|---|---|---|---|
| 6,128,472 A | 10/2000 | Harel et al. | |
| 6,421,324 B1 | 7/2002 | Boyle et al. | |
| 6,683,526 B2 | 1/2004 | Bellin | |
| 6,771,635 B1 | 8/2004 | Vilander et al. | |
| 6,925,297 B2 | 8/2005 | Wenzel | |
| 6,944,137 B1* | 9/2005 | Pan et al. | 370/266 |
| 2002/0081994 A1* | 6/2002 | Aoyagi | 455/411 |
| 2003/0112976 A1 | 6/2003 | Quick, Jr. et al. | |
| 2003/0236082 A1* | 12/2003 | Aoki et al. | 455/278.1 |
| 2004/0091107 A1* | 5/2004 | Fujisaki et al. | 380/42 |
| 2004/0203770 A1* | 10/2004 | Chen et al. | 455/435.1 |
| 2005/0281208 A1* | 12/2005 | Dorenbosch et al. | 370/270 |
| 2007/0041371 A1* | 2/2007 | Hattori | 370/352 |
| 2007/0210961 A1* | 9/2007 | Romijn | 342/464 |
| 2008/0155689 A1* | 6/2008 | Denninghoff et al. | 726/22 |

FOREIGN PATENT DOCUMENTS

| | | |
|---|---|---|
| EP | 1227629 | 7/2002 |
| EP | 1315394 | 5/2003 |

OTHER PUBLICATIONS

"Microsoft Computer Dictionary, 5th Edition", Microsoft Press, 2002; ISBN 0-7356-1495-4, "Logic" Definition, p. 317.*
International Preliminary Report on Patentability, PCT/US2007/086994, International Bureau of WIPO, Jun. 25, 2009.
International Search Report-PCT/US07/086994, International Search Authority—European Patent Office—Jul. 31, 2008.
Written Opinion—PCT/US07/086994, International Search Authority—European Patent Office—Jul. 31, 2008.

* cited by examiner

*Primary Examiner* — Rafael Pérez-Gutiérrez
*Assistant Examiner* — Daniel Nobile
(74) *Attorney, Agent, or Firm* — Raphael Freiwirth

(57) ABSTRACT

A system and method for optimizing call setup latency for geographically dense groups including updating client location information using at least one application server while the client moves from one sector to another to provide a location update; identifying and updating parameters including location update information uniquely identifying a sector from which a client is receiving communication service; and determining at least one geographically dense call group; and choosing at least one designated responder to the at least call group. A client per cluster is selected as a designated responder for that cluster and when the server needs to set up a geographically dense group call, a random number is included corresponding to the designated responder for that group in a call setup message.

19 Claims, 4 Drawing Sheets

OPTIMIZING CALL SETUP LATENCY FOR GEOGRAPHICALLY DENSE GROUPS

BACKGROUND OF THE INVENTION

1. Field

The present invention generally relates towards reducing communication latency. More particularly, the present invention relates to optimizing call latency in a group call communication system when participants are geographically co-located in a small number of sectors in a Radio Access Network (RAN).

2. Background

Advances in technology have resulted in smaller and more powerful personal computing devices. For example, there currently exists a variety of portable personal computing devices, including wireless computing devices, such as portable wireless telephones, laptops, personal digital assistants (PDAs) and paging devices that are each small, lightweight, and can be easily carried by users. A wireless device is any device that can communicate with other devices without being physically attached to them. Most wireless devices communicate with each other through radio frequencies.

More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

However, these smaller and more powerful personal computing devices are typically severely resource constrained. For example, the screen size, amount of available memory and file system space, amount of input and output capabilities and processing capability may each be limited by the small size of the device. Due to severe resource constraints, it is often typically desirable, for example, to maintain a limited size and quantity of software applications and other information residing on such remote personal computing devices (e.g. client devices).

Some of the personal computing devices utilize an application programming interface (API) or application programming interfaces (APIs), sometimes referred to as runtime environments and software platforms, that are installed onto their local computer platform and which are used, for example, to simplify operations of such devices, such as by providing generalized calls for device specific resources. An API is a set of routines used by an application program to direct the performance of procedures used by the computer's operating system.

Further, some APIs are also known to provide software developers the ability to create software applications that are fully executable on such devices. In addition, some of such APIs are known to be operationally located between the computing device system software and the software applications such that the computing device system software and the software applications such that the computing device computing functionality is made available to the software application without requiring the software developer to have the specific computing device system source code. Further, some APIs are known to provide mechanisms for secure communications between such personal devices (i.e., clients) and remote devices (i.e., servers) using secure, cryptographic information.

Examples of such APIs, some of which are discussed in more detail below, include versions of the Binary Runtime Environment for Wireless® (BREW®) developed by QUALCOMM, Inc., of San Diego, Calif. BREW® can operate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing the BREW® API. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security, and application distribution functionality, and the client performs, for example, application execution, security and user interface functionality.

Mobile communication devices (e.g. wireless telephones) may include a built-in input device (e.g., a keypad) to allow a user to input alpha-numeric data. Due to the limited size of such mobile devices, the input device is often relatively small, which can be difficult and/or slow to use for a typical user.

The foregoing description of the related art is merely intended to provide an overview of wireless devices and some of the known uses of APIs and as an introduction to the BREW® platform, which can be used in various embodiments of the invention. However, the invention is not to be construed as being limited to a specific physical configuration, implementation, operating platform or environment.

In a group call communication system, the reduction of latency is an important design goal which directly translates into end user customer satisfaction and utility. Some examples of sources or contributors of latency in a wireless network follow. Channel assignment latency is a delay in assigning and initializing a traffic channel for the user's communication needs. Paging latency is a delay incurred while waiting for the user's mobile device to respond to a page in an appropriate paging channel slot. Over-the-air transmission is another source of latency as the calls originate, travel and are received over a communication infrastructure.

In addition to these types of delays, there are delays that may also occur at the group call communication server. Some examples of server delays are user request processing and server component communication.

In a Push to Talk (PTT) system, all of the various types of delays contribute to PTT latency. PTT latency is the delay between the time the user requests a floor, by pressing the PTT button, and the time the user receives confirmation from a PTT application server that the call has been established and the floor is available. With the exception of paging latency, the delays described above also contribute to end-to-end media latency, which is the delay between the time the originator starts speaking and the time when the targets actually hear the originator's speech.

Therefore, it is desirable and advantageous to provide a method for reducing latency in a group communication system.

SUMMARY OF THE INVENTION

Exemplary embodiments of the present invention are directed towards a system and method for optimizing call setup latency for geographically dense groups.

Accordingly, one embodiment of the invention can include a method for optimizing call setup latency comprising: updating client location information using at least one application server to provide a location update while at least one client moves from one sector to another; identifying and updating parameters including location update information uniquely identifying a sector from which the at least one client is receiving communication service; determining at least one geographically dense call group; choosing at least one designated responder to respond to the at least one call group; computing clusters of clients with related parameters; and selecting at least one client per cluster as a designated responder for that cluster and when the server needs to set up a geographically dense group call, a random number is included corresponding to the designated responder for that group in a call setup message.

Another embodiment of the invention can include a system for optimizing call setup latency comprising: logic configured to update client location information using at least one application server to provide a location update while at least one client moves from one sector to another; logic configured to identify and update parameters including location update information uniquely identifying a sector from which the at least one client is receiving communication service; logic configured to determine at least one geographically dense call group; logic configured to choose at least one designated responder to respond to the at least one call group; logic configured to compute clusters of clients with related parameters; and logic configured to select at least one client per cluster as a designated responder for that cluster and when the server needs to set up a geographically dense group call, a random number is included corresponding to the designated responder for that group in a call setup message.

Another embodiment of the invention can include a computer readable media embodying a method in a wireless communication system, the method comprising: updating client location information using at least one application server to provide a location update while at least one client moves from one sector to another; identifying and updating parameters including location update information uniquely identifying a sector from which the at least one client is receiving communication service; determining at least one geographically dense call group; choosing at least one designated responder to respond to the at least one call group; computing clusters of clients with related parameters; and selecting at least one client per cluster as a designated responder for that cluster and when the server needs to set up a geographically dense group call, a random number is included corresponding to the designated responder for that group in a call setup message.

BRIEF DESCRIPTION OF THE DRAWINGS

A more complete appreciation of embodiments of the invention and many of the attendant advantages thereof will be readily obtained as the same becomes better understood by the reference to the following detailed description when considered in connection with the accompanying drawings which are presented solely for illustration and not limitation of the invention, and in which.

DETAILED DESCRIPTION OF THE INVENTION

Various embodiments of the invention are disclosed in the following description and related drawings directed to specific embodiments of the invention. Alternate embodiments may be devised without departing from the spirit and scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action or function.

One or more embodiments of the invention can be used in conjunction with a runtime environment (e.g., API) executing on a computing device. One such runtime environment (API) is the Binary Runtime Environment for Wireless® (BREW®) software previously discussed. However, one or more embodiments of the invention can be used with other types of runtime environments (APIs) that, for example, operate to control the execution of applications on wireless client computing devices.

The following techniques and mechanisms are directed to implementing methods and components of mobile electronic device to interoperate with an input device via a standard earphone/microphone connector. In general, the mobile electronic device includes an interface to support data transfer between the mobile electronic device and the input device via the standard earphone/microphone connector. This interface can be implemented in hardware and/or software. Specific implementations and embodiments of this general concept are described below.

Figure 1:
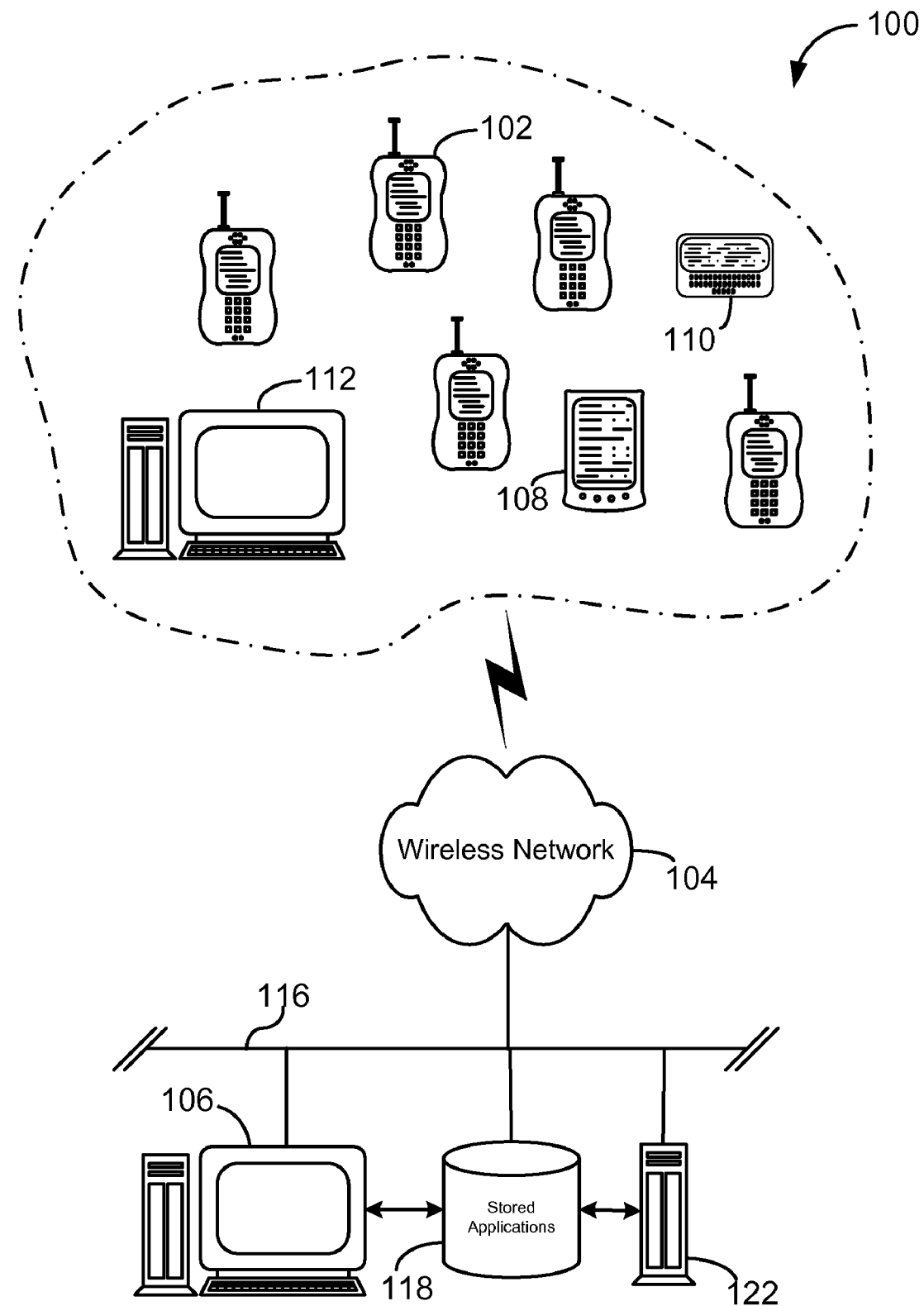
FIG. 1 is an exemplary diagram of a wireless network architecture that supports client devices and servers in accordance with at least one embodiment of the invention.

FIG. 1 illustrates a block diagram of one exemplary embodiment of a wireless system 100 in accordance with at least one embodiment of the invention. System 100 contains client devices, such as cellular telephone 102, in communication across a wireless network 104 with at least one application download server (ADS) 106 that selectively transmits software applications and components to wireless devices across a wireless communication portal or other data access to the wireless network 104. As shown in FIG. 1, the wireless (client) device can be a cellular telephone 102, a personal digital assistant 108, a pager 110, which is shown here as a two-way text pager, or even a separate computer platform 112 that has a wireless communication portal. This separate computer platform 112 may be fixed (e.g. desktop) or mobile (e.g. laptop).

The various embodiments of the invention can thus be realized on any form of client device or wireless devices including a wireless communication portal of having wireless communication capabilities, including without limitation, wireless modems, PCMCIA cards, personal computers, access terminals, telephones, or any combination or sub-combination thereof.

The application download server (ADS) 106 is shown here on a network 116 with other computer elements in communication with the wireless network 104. There can be a stand-alone server 122, and each server can provide separate services and processes to the client devices 102, 108, 110 and 112 across the wireless network 104. There is preferably also at least one stored application database 118 that holds the software applications that are downloadable by the wireless devices 102, 108, 110 and 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality. Further, not all elements (e.g., pager 110, ADS 106, database 118, etc.) illustrated are necessarily used in all of the different embodiments of the invention that may be implemented.

Figure 2:
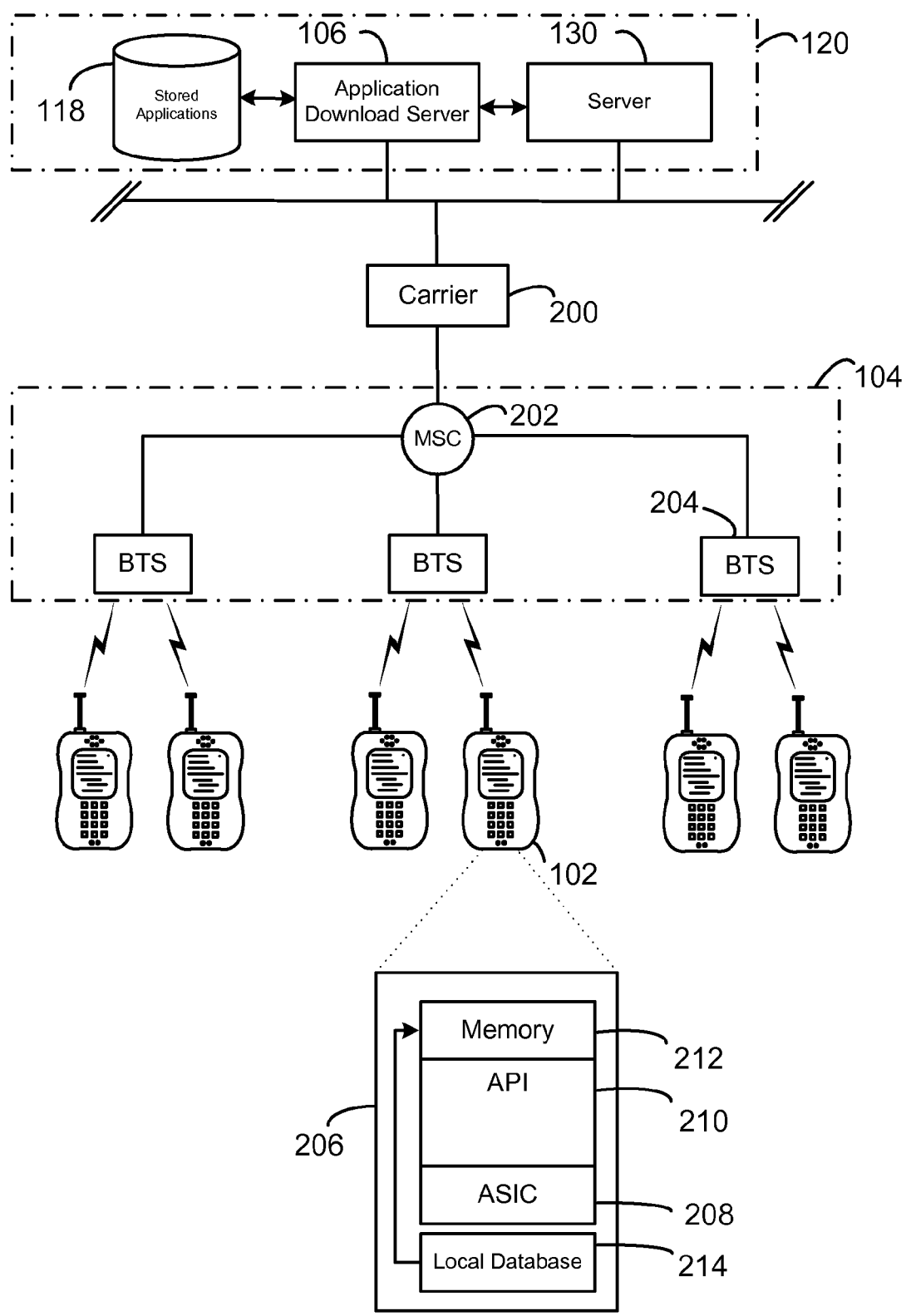
FIG. 2 is a more detailed exemplary diagram of a wireless network architecture that supports the client devices and servers in accordance with at least one embodiment of the invention.

In FIG. 2, a block diagram is shown that more fully illustrates system 100, including the components of the wireless network 104 and the interrelation of the elements of the exemplary embodiments of the invention. System 100 is merely exemplary and can include any system that allows remote client devices, such as wireless client computing devices 102, 108, 110 and 112 to communicate over-the-air between and among each other and/or between and among components connected via a wireless network 104, including, without limitation, wireless network carriers and/or servers. The application download server 106 and the stored application database 118, along with any other servers such as ad display server 130 which are used to provide cellular telecommunications services, communicate with a carrier network, through a data link, such as the Internet, a secure LAN, WAN, or other network. In the embodiment shown, a server 120 can include the application download server 106, ad dispatch server 130 and the stored application database 118. The application download server 106, server 130 and the stored application database 118 are illustrated as independent devices in this embodiment. However, these devices can also be integrated into one common server or the functionality of one or more may be distributed over multiple devices, as will be appreciated by those skilled in the art.

The carrier network 200 controls messages (typically sent as data packets) sent to a messaging service controller (MSC) 202. The carrier network 200 communicates with the MSC 202 by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations (BTS) 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as cellular telephone 102, by short messaging service (SMS), UDP datagrams, or other over-the-air (OTA) methods known in the art.

The client device, (here a wireless client computing device), such as a cellular telephone 102, has a computer platform 206 that can receive and execute software applications and/or commands transmitted form the application download server 106, ad dispatch server 130 and/or server 120. The computer platform 206 can include an application specific integrated circuit (ASIC) 208, or other processor, microprocessor, logic circuit, or other data processing device. The ASIC 208 or other processor executes the API 210 layer that interfaces with any resident programs in the memory 212 of the wireless device. The memory 212 can be comprised of read-only or random-access memory (RAM and ROM), EEPROM, flash cards, or any memory common to computer platforms. The computer platform 206 also includes a local database 214 that can hold applications not actively used in memory 212. The local database 214 is typically a flash memory cell, but can be any secondary storage device as know to those skilled in the art, such as magnetic media, EPROM, optical media, tape, soft or hard disk, or the like.

The wireless client computing device, such as cellular telephone 102, has installed on it, or otherwise downloads, one or more software applications, such as games, news, stock monitors, and the like. For example, the cellular telephone 102 may receive one or more software applications downloaded from the application download server 106. The software applications may be stored on the local database 214 when not in use. The cellular telephone 102 or other wireless computing device may upload resident applications stored on the local database 214 to memory 212 for execution on the API 210 when so desired by the user or invoked by another API.

As used herein "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to ads communicated between a client device and a server. The client computing device can be serviced by at least one remote server with respect to at least such ads. Some examples of "wireless computing devices" which may be used in accordance with various embodiments of the present invention includes cellular telephones or other wireless communication units, PDAs, laptops, paging devices, navigation devices (e.g., GPS-based systems), handheld gaming devices, music or video content download units, and other like wireless communication devices.

The wireless communication between the client device 102 and the BTS 204 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

Public safety and disaster recovery scenarios call for effective and efficient communication between a large set of mobile devices. Latencies incurred during call setups for these large groups are as important a metric as the efficiency in transporting media between these devices.

A group communication system (e.g a Push to Talk (PTT) system) typically attempts to provide numerous features to end users, including instant access, always on and a guaranteed talk permit. Instant access refers to providing a user perception that the group communication system is providing instant and continuous access to the group communication system. Feedback should exist regarding the success or failure of any request made by a user for group communication services. Always on should provide the perception that the group communication system is readily available at all times. It is desirable that a user has constant connectivity to the group communication for as long as the user desires. A guaranteed talk permit guarantees that the user's speech is delivered to at least one or more of the specified targets. The group communication system should also confirm target participation in the group communication call prior to granting the originator permission to talk.

In addition to the large number of participants in these group calls, a new challenge arises when the participants are geographically co-located in a small number of sectors in the Radio Access Network (RAN). The increased probability of collisions on the access channel due to acknowledgment (ACK) implosion is demonstrated in FIG. 3 where a large number of devices attempt to respond at the same time.

Figure 3:
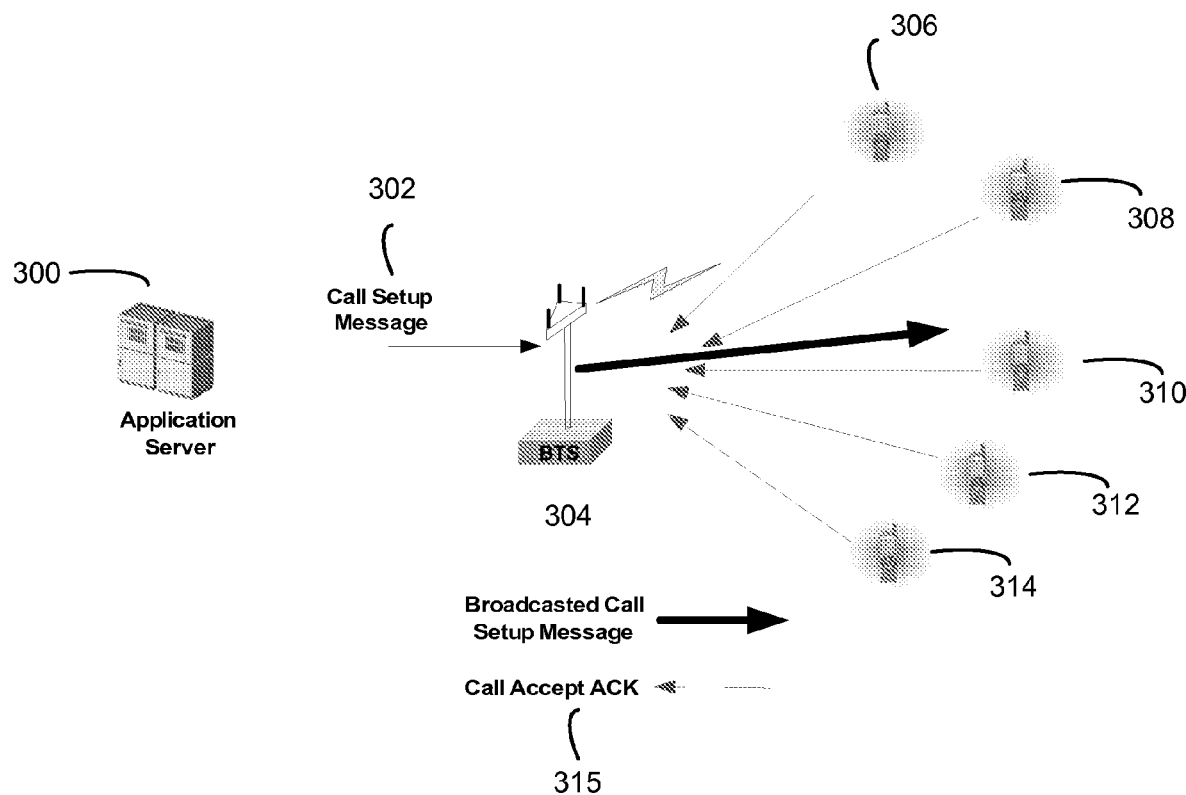
FIG. 3 is an exemplary diagram illustrating an ACK implosion.

FIG. 3 illustrates one example of an ACK explosion scenario. An application server 300 sends a call setup message 302 to a base station transceiver (BTS) 304. The BTS 304 broadcasts a call setup message 305 to a group of client devices (the handsets 306, 308, 310, 312 and 314 shown in FIG. 3). When all of the client devices attempt to respond at the same time or at nearly the same time (call accept ACK 315), there is an increase in the number of collisions on the access channel.

The phenomenon shown in FIG. 3 causes an increase in the call setup times as the response to the call setup message is delayed. During call setups for geographically dense groups and multicast groups a high number of access probe collisions occur as multiple targets registered in the same sector attempt to respond to the call request at the same time. These collisions cause an increase in call setup times. The application layer scheme proposed herein potentially eliminates the collision probability by having the application server choose designated responders to these large group calls.

After the designated responders are chosen (e.g., one per cluster), the logical OR-ing of the identifiers means that there is no particular order for responding. If a device sees that its identifier was used as a part of the calculation of the bit-sequence in the CALL message, it will respond immediately. The other devices will hold off their responses.

A geographically dense call can have multiple clusters (e.g. one hot-spot or cluster per collision domain or BTS). In this embodiment, we have suggested that the server select exactly one designated responder from every cluster. The server could select multiple responders per cluster, but this would increase the probability of a collision when the responders respond to the message sent by the server. As far as ordering the designated responders for different clusters, this is not necessary as the call message is sent out to all these clusters (addressed to the union of designated responders).

Figure 4:
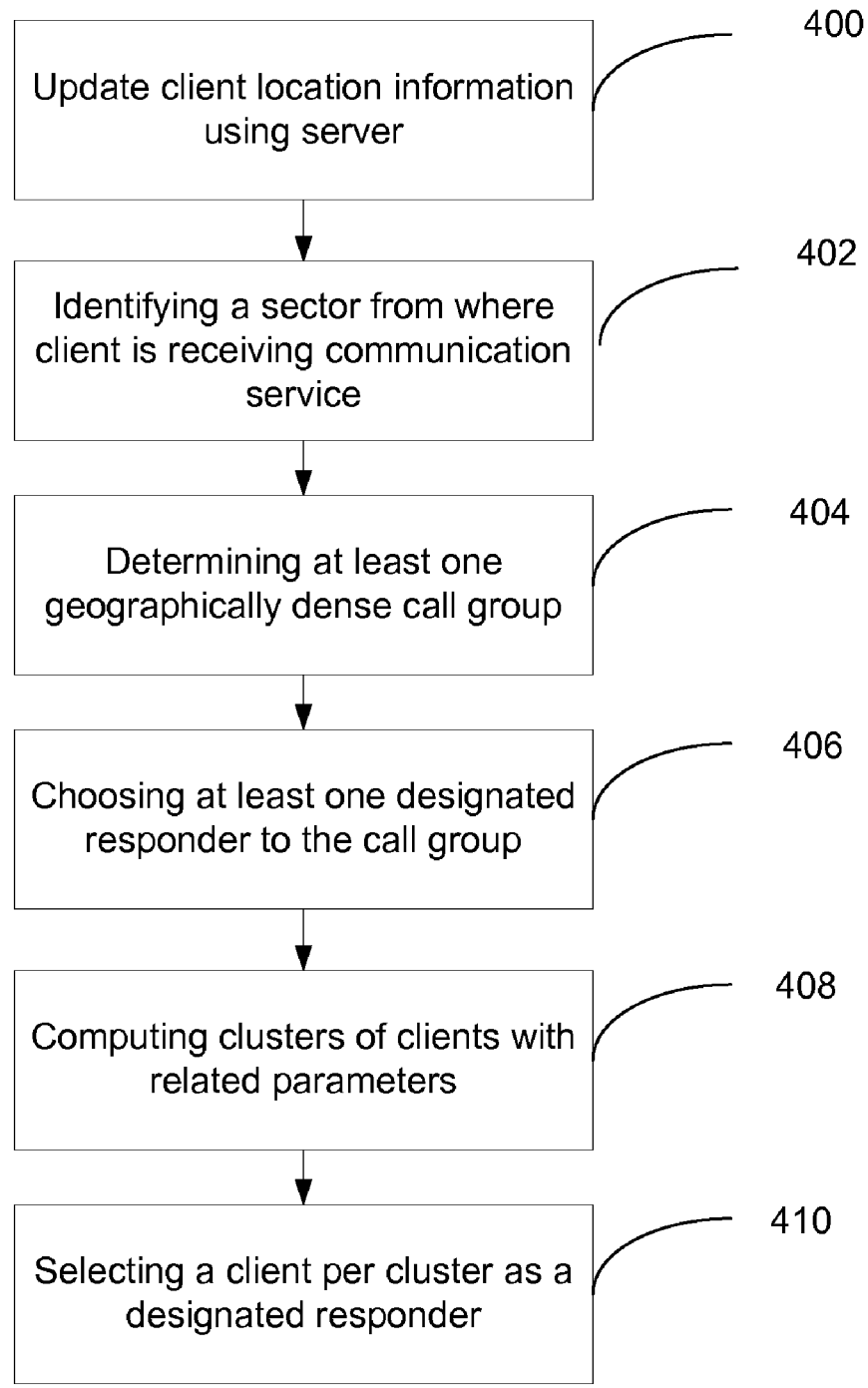
FIG. 4 is an exemplary diagram illustrating method in accordance with at least one embodiment of the invention.

FIG. 4 illustrates an exemplary method for optimizing call setup latency implementing one embodiment of the present invention. Client location information is updated using at least one application server 400 to provide a location update while a client moves from one sector to another. Parameters are identified and updated including location update information uniquely identifying a sector from which a client is receiving communication service 402. At least one geographically dense call group is determined 404. At least one designated responder is chosen to respond to the call group 406. Clusters of clients with related parameters are computed 408. A client per cluster is selected as a designated responder for that cluster and when the server needs to set up a geographically dense group call a random number is included corresponding to the designated responder for that group in a call setup message 410.

However, as a large group call can span multiple sectors, choosing a single responder may not be the most optimal choice due to fault tolerance considerations. A server can choose multiple designated responders without increasing the size of the call setup message.

In one exemplary scenario, the server chooses exactly one designated responder per cluster. A cluster is defined as the set of devices that are receiving communication service from a single BTS (alternatively, the devices are in the same collision domain). Therefore, the total number of responders depends on how many dense-clusters (or hot-spots) exist for a specified group call.

The server maintains state for the set of predefined groups likely to be geographically dense. Those skilled in the art will appreciate that multicast groups will also benefit from the scheme defined here and operates in a similar manner.

This is because the "identifier" contained in the server message is responsible for eliminating collisions on response. The method is independent of the addressing scheme (e.g. multicast groups with multicast IP addresses) and the transport mechanism (e.g. unicast or multicast).

The clients routinely update location information with the application server while moving from one sector to the other. The location updates include parameters that help uniquely identify the sector from which the client is receiving CDMA service (e.g. System ID (SID), Network ID (NID), Carrier identifier, pilot PN offset).

The client also includes an n-bit random number that it generates. As will be discussed later, a larger n results in a lower collision probability. However, as the server will include this n-bit number in the call request, a larger n will result in a larger call announcement message. For example, one value of n that may be selected is 16. Some of the following considerations are used in selecting a value of n.

Due to considerations such as processor design, efficiency of computation on a PC/server/device), the value of n should be a multiple of 8-bits. The probability that at-least 2 devices in a cluster (of size k) pick the same identifier decays exponentially with the value of n, and can be approximated by the expression $$P(k,n)=1-e^{(-(k^2)/(2*2^n))}.$$

For n=8, and a reasonably sized cluster (e.g k=20) the probability that 2 devices pick the same ID is $1-(e^{(-(20^2)/(2*(2^8))))}=0.542166638$. For n=16 and the same cluster size, the probability is $1-(e^{(-(20^2)/(2*(2^16))))}=0.00304710593$, which is sufficiently small. The client can additionally include pilot strength as an indication of physical proximity with the base station. It should be noted that as the access probe power is normalized to take this into account, physical proximity may not be representative of the access probe signal quality.

The server maintains state (SID, NID, random#) for members of all geographically dense predefined groups. For each group, the server computes clusters of clients with the same <SID, NID> pair and selects exactly one client per cluster as the designated responder for that cluster.

The <SID, NID> pair is used by the server to identify clusters (or hot-spots). Multiple devices advertising the same <SID, NID> are expected to be in a geographical vicinity or proximity, and hence they can be assumed to be in the same cluster. After having identified these clusters and the designated responders for these clusters, the server uses the random numbers advertised by the designated responders in the OR-ing calculation.

The server then computes the logical OR of the random numbers corresponding to the designated responders of m largest clusters. The following illustration is provided as an example.

Lets say the server received the following <SID, NID, random#> from 10 devices.
1. <1, 1, 4324>
2. <1, 2, 6553>
3. <2, 1, 7722>
4. <3, 1, 46536>
5. <1, 1, 25232>
6. <1, 1, 43456>
7. <4, 1, 5653>
8. <1, 1, 63434>
9. <1, 1, 34236>
10. <1, 1, 23423>

The server deduces that <1, 1> is a hotspot, and chooses the designated responder to be device number 6. Also, for reliability, the devices advertising different <SID,NID> pairs are included in the OR-ing operation. And the final identifier is:
6553 (from device 2) <Logical OR>7722 (from device 3) <Logical OR>43456 (from device 6)

0001100110011001 OR 0001111000101010 OR 1010100111000000=1011111111111011=49147 (decimal)

When device 2 gets this identifier (49147) in the message, it does the computation: 6553 AND 49147 which yields 6553 so it goes ahead and responds. However, from all the devices in the cluster <1, 1>, only device 6 gets this right.
43456 AND 49147=43456
For device 9,
34236 AND 49147=34232 which is not the same as 34236, and so it does not respond.

The reason for selecting m largest clusters to provide collision resistance follows.
$S_{sector}$ represents the number of clients in a sector
$S_{dense}$ represents the access terminals that belong to the geographically dense group
$S_{sparse}$ represents the remaining access terminals $S_{sector}-S_{dense}$ A large cluster implies that there are a large number of Access Terminals (ATs) that are members of a single geographically dense group reside in the same sector (collision domain). That is $S_{dense}/S_{sector}$ is close to unity.

By handpicking the designated responders, the server has already minimized the probability that the access probes of the access terminals that belong to $S_{dense}$ collide with each other.

The collisions that are now of concern to us are the ones between the members of $S_{sparse}$. This probability grows as $S_{sparse}$ grows, and is smaller when $S_{sparse}$ is small. This suggests that collision random probabilities will be small if $S_{sparse}$ is small.

Random collision probability reduces as $S_{sparse}$ shrinks
=>$S_{sparse}$ is small=>$S_{sector}-S_{dense}$ is small
If $S_{sector}$=constant=k, $S_{dense}$ should be as large as possible The value of m should be small. The situation where m=1 means that only one designated responder is chosen from a set of clusters, and if this device happens to be near a cell edge, the server message destined to the device might have to be retransmitted multiple times, thereby incurring delay. The value of m is flexible, and if there is a fair amount of certainty that the message will reach the set of m responders (based on pilot strength or other estimates for example), m can be made smaller. This value can be optimized based on the carrier policy, and is subjective. In order to make this step less computationally expensive, the selection may be random or based on the pilot strength measurement or some other heuristic.

When the server needs to set up a geographically dense group call, it includes the random number corresponding to the designated responder for that group in the call setup (announcement) message.

The random number is used by the device to present a unique numerical value to the server based on which the server calculates an identifier which is used by the device to identify whether or not it should respond. The previous example regarding <SID, NID, random#> sent by different devices is directed towards this concept.

When the targets receive the call setup message, they compute the logical AND operation on the number included in the announcement message, and the random number the client generated during the registration process. If the following expression is true, the client goes ahead and responds to the announcement without any extra delay at the application layer.
REG_RAND && ANNOUNCE_IDENT==REG_RAND If the above condition is not met, the client waits for a deterministic amount of time equal to the transmission time of an access probe containing the response to the announcement. Doing this results in a significant reduction in the number of access collisions during group call setups.

The arrangement of the logic elements is merely for the convenience of illustration and should not be construed as limiting embodiments of the invention. As will be appreciated by those skilled in the art, the functionality of the logic elements described herein may be integrated into one element or distributed as desired among various hardware and software elements.

Those skilled in the art will also appreciate that software or firmware (or any combination thereof) may also be used to implement the present invention.

Those skilled in the art will appreciate that there is no particular order of performing and executing the method functional blocks intended or implied in the preceding description. The foregoing methods discussed above can be used by themselves or in any combination thereof to achieve the same objective.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary or tertiary media. The media may comprise, for example, RAM accessible by, or residing within, the client device and/or server. Whether contained in RAM, a diskette, or other secondary storage media, the instructions may be stored on a variety of machine-readable data storage media, such as direct access storage device (DASD) storage (e.g., a conventional "hard drive" or a RAID array), magnetic tape, electronic read-only media (e.g., ROM, or EEPROM), flash memory cards, an optical storage device (e.g. CD-ROM, WORM, DVD, digital optical tape), paper "punch" cards, or other suitable data storage media including digital and analog transmission media.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described in the singular, the plural is contemplated unless the limitation to the singular is explicitly stated.

The invention claimed is:

1. A method for optimizing call setup latency comprising:
   updating client location information using at least one application server to provide a location update while at least one client moves from one sector to another;
   identifying and updating parameters including location update information uniquely identifying a sector from which the at least one client is receiving communication service;
   determining at least one geographically dense call group;
   choosing at least one designated responder to respond for the at least one geographically dense call group;
   computing clusters of clients with related parameters; and
   selecting at least one client per cluster as a designated responder for that cluster and when the server needs to set up a geographically dense group call, a random number is included corresponding to the designated responder for that group in a call setup message; wherein the designated responder for that cluster responds to call setup messages and clients that are not selected as designated responders do not respond to call setup messages.

2. The method of claim 1 wherein the random number is generated as a function of the logical OR of random numbers corresponding to the designated responders of a selected subset of a plurality of target clusters.

3. The method of claim 1 wherein a large cluster indicates that a large number of access terminals (AT) are members of a single geographically dense group residing in the same sector or collision domain.

4. The method of claim 1, wherein the client information comprises at least a System ID (SID) and a Network ID (NID).

5. The method of claim 1, wherein the client information comprises a communications network parameter.

6. The method of claim 1, wherein the client information comprises a carrier identifier.

7. The method of claim 1, wherein the client information comprises pilot signal related information.

8. The method of claim 1, wherein the client information comprises a pilot PN Offset.

9. The method of claim 1, wherein the server maintains state for a set of predefined groups that are likely to be geographically dense.

10. The method of claim 1, wherein the location update information includes a random number that the client generates as a signature and is used by the server in a call setup message after choosing at least one designated responder.

11. The method of claim 10, wherein when the at least one client receives the call setup message, the at least one client computes a logical AND operation on the random number and said random number that the client generates as a signature.

12. A system for optimizing call setup latency, the system comprising a processor and a computer readable medium, the system configured to:
   update client location information using at least one application server to provide a location update while at least one client moves from one sector to another;
   identify and update parameters including location update information uniquely identifying a sector from which the at least one client is receiving communication service;
   determine at least one geographically dense call group;
   choose at least one designated responder to respond for the at least one geographically dense call group;
   compute clusters of clients with related parameters; and
   select at least one client per cluster as a designated responder for that cluster and when the server needs to set up a geographically dense group call, a random number is included corresponding to the designated responder for that group in a call setup message; wherein the designated responder for that cluster responds to call setup messages and clients that are not selected as designated responders do not respond to call setup messages.

13. The system of claim 12, further configured to compute the logical OR of random numbers corresponding to the designated responders of a selected subset of a plurality of largest clusters.

14. The system of claim 12, further configured to indicate that a large number of access terminals (AT) are members of a single geographically dense group residing in the same sector or collision domain.

15. The system of claim 12, further configured to maintain state for a set of predefined groups that are likely to be geographically dense.

16. A tangible computer readable storage medium embodying a method in a wireless communication system, the method comprising:
   updating client location information using at least one application server to provide a location update while at least one client moves from one sector to another; identifying and updating parameters including location update information uniquely identifying a sector from which the at least one client is receiving communication service;
   determining at least one geographically dense call group;
   choosing at least one designated responder to respond for the at least one geographically dense call group;
   computing clusters of clients with related parameters; and
   selecting at least one client per cluster as a designated responder for that cluster and when the server needs to set up a geographically dense group call, a random number is included corresponding to the designated responder for that group in a call setup message; wherein the designated responder for that cluster responds to call setup messages and clients that are not selected as designated responders do not respond to call setup messages.

17. The tangible computer readable storage medium of claim 16, further comprising computing the logical OR of random numbers corresponding to the designated responders of a selected subset of a plurality of largest clusters.

18. The tangible computer readable storage medium of claim 16, comprising logic configured to indicate that a large number of access terminals (AT) are members of a single geographically dense group residing in the same sector or collision domain.

19. The tangible computer readable storage medium of claim 18, wherein the server maintains state for a set of predefined groups that are likely to be geographically dense.

* * * * *